United States Patent
Jansen et al.

(10) Patent No.: US 11,630,796 B2
(45) Date of Patent: Apr. 18, 2023

(54) SERIAL PERIPHERAL INTERFACE (SPI) AUTOMATIC REGISTER ADDRESS INCREMENTATION ACROSS DATA FRAMES

(71) Applicant: Infineon Technologies AG, Neubiberg (DE)

(72) Inventors: Andreas Jansen, Murnau (DE); Richard Heinz, Munich (DE); Catalina-Petruta Juglan, Botosani (RO); Stephan Leisenheimer, Deisenhofen (DE); Lacramioara Mihaela Smochina, Roman (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/314,203

(22) Filed: May 7, 2021

(65) Prior Publication Data
US 2022/0358077 A1    Nov. 10, 2022

(51) Int. Cl.
*G06F 13/42*    (2006.01)
*G06F 13/40*    (2006.01)
*G06F 13/374*    (2006.01)
*G06F 9/30*    (2018.01)
*G06F 9/32*    (2018.01)

(52) U.S. Cl.
CPC ...... *G06F 13/4282* (2013.01); *G06F 9/30101* (2013.01); *G06F 9/321* (2013.01); *G06F 13/374* (2013.01); *G06F 13/4022* (2013.01)

(58) Field of Classification Search
CPC .. G06F 13/4282; G06F 9/30101; G06F 9/321; G06F 13/374; G06F 13/4022
See application file for complete search history.

(56) References Cited

U.S. PATENT DOCUMENTS

| | | | | |
|---|---|---|---|---|
| 7,296,124 B1 * | 11/2007 | Falik | ................... | G06F 13/1647 711/219 |
| 8,135,881 B1 * | 3/2012 | Obkircher | ........... | G06F 13/4291 710/37 |
| 9,450,620 B1 * | 9/2016 | Ahmed | ..................... | H04B 1/40 |
| 2006/0239104 A1 * | 10/2006 | Lee | .......................... | G11C 8/06 365/230.01 |

(Continued)

*Primary Examiner* — Henry Tsai
*Assistant Examiner* — Harry Z Wang
(74) *Attorney, Agent, or Firm* — Harrity & Harrity, LLP

(57) ABSTRACT

A serial peripheral interface (SPI) communication system includes a memory configured with a start register address and an end register address that define a register address range for a data operation; a chip select terminal configured to receive a chip select signal comprising an active and idle signal levels that define a plurality of chip select frames; a serial data input terminal configured to receive a master out, slave in (MOSI) signal, wherein the MOSI signal includes configuration information received in a first chip select frame of the data operation, wherein the configuration information includes an operation command bit indicating whether the data operation is a write operation or a read out operation and an auto-incrementation control bit indicating whether automatic register address incrementation across chip select frames is enabled or disabled; and a serial data output terminal configured to transmit a master in, slave out (MISO) signal.

24 Claims, 6 Drawing Sheets

(56) References Cited

U.S. PATENT DOCUMENTS

| | | | | |
|---|---|---|---|---|
| 2009/0132751 A1* | 5/2009 | Simmons | .............. | G06F 13/385 |
| | | | | 711/E12.082 |
| 2014/0115209 A1* | 4/2014 | Heinrich | ............. | G06F 13/4291 |
| | | | | 710/110 |
| 2020/0356501 A1* | 11/2020 | Krause | ................ | G06F 13/4282 |
| 2020/0371977 A1* | 11/2020 | Sangolli | .............. | G06F 13/4282 |

* cited by examiner

SERIAL PERIPHERAL INTERFACE (SPI) AUTOMATIC REGISTER ADDRESS INCREMENTATION ACROSS DATA FRAMES

BACKGROUND

The Serial Peripheral Interface (SPI) is a synchronous serial communication interface specification used for short-distance communication, primarily in embedded systems. In particular, it is an interface bus commonly used to send data between microcontrollers and peripherals (e.g., peripheral integrated circuits (ICs)) such as shift registers, sensors, analog-to-digital converters (ADCs), digital-to-analog converters (DACs), and memory devices. It uses separate clock and data lines, along with a select line used to select which peripheral device to communicate with. The microcontroller is typically referred to as the master device or IC and the peripherals are typically referred to as slave devices or ICs.

To begin SPI communication, the master uses a command byte in an SPI communication frame to set up the communication for a selected slave. For this set up, the master typically transmits a start register address (i.e., an address byte) to the slave indicating from which slave register address the slave is to start reading out data for the master's read operation or a slave register address starting with which the master is to write data to the slave. The slave must wait for the start register address before it can start transmitting data from its register to the master or before it can start receiving write data from the master.

For a communication that spans multiple SPI communication frames, the master must identify the start register address for each frame. Not only does this delay the data transmission performed by the slave but transmitting the start register address uses up a portion of the allotted SPI communication frame, thereby creating overhead. Accordingly, transmitting the start register address for each frame (i.e., for each read out) can be inefficient.

For example, for a microcontroller with an x-byte SPI buffer, the microcontroller can read or write data using x-byte frames, where each SPI communication frame has a bandwidth of x-bytes. This often leads to several sequential read outs using sequential x-byte frames or several sequential write frames using x-byte frames. This means for a 4-byte SPI buffer, 25% of each frame is lost for addressing—being used by the master to transmit the start register address at the beginning of each SPI communication frame.

Therefore, an improved SPI communication interface that employs a more efficient use of SPI communication frames may be desirable.

SUMMARY

One or more embodiments provide a serial peripheral interface (SPI) communication system, including a slave device. The slave device includes a data register configured with a start register address and an end register address that define a register address range for a read out operation; a chip select terminal configured to receive a chip select signal including an active signal level and an idle signal level that define a plurality of chip select frames, wherein an end of each chip select frame is defined by an idle signal edge that is a transition from the active signal level to the idle signal level; a serial data input (SDI) terminal configured to receive a master out, slave in (MOSI) signal, wherein the MOSI signal includes configuration information received in a first chip select frame to start the read out operation; and a serial data output (SDO) terminal configured to transmit a master in, slave out (MISO) signal including data portions during the read out operation, wherein each data portion is sequentially read out from a different register address of the data register. The slave device is configured to: during the first chip select frame, increment a register address to correspond to each memory location sequentially read out from the data register, at an end of the first chip select frame, demarked by an idle signal edge of the chip select signal, compare an end-of-frame register address with the end register address, on a first condition that the end-of-frame register address at the end of the first chip select frame is less than the end register address, automatically increment the register address at a next chip select frame in order to perform automatic register address incrementation across the first and the next chip select frames, and on a second condition that the end-of-frame register address at the end of the first chip select frame is equal to or greater than the end register address, stop the read out operation.

One or more embodiments provide a method of performing serial peripheral interface (SPI) communication with a slave device including a data register configured with a start register address and an end register address that define a register address range for a read out operation. The method includes: receiving, by the slave device, a chip select signal including an active signal level and an idle signal level that define a plurality of chip select frames, wherein an end of each chip select frame is defined by an idle signal edge that is a transition from the active signal level to the idle signal level; receiving, by the slave device, a master out, slave in (MOSI) signal, wherein the MOSI signal includes configuration information received in a first chip select frame to start the read out operation; transmitting, by the slave device, a master in, slave out (MISO) signal including data portions during the read out operation, wherein each data portion is sequentially read out from a different register address of the data register; during the first chip select frame, incrementing, by the slave device, a register address to correspond to each memory location sequentially read out from the data register; at an end of the first chip select frame, demarked by an idle signal edge of the chip select signal, comparing, by the slave device, an end-of-frame register address with the end register address; on a first condition that the end-of-frame register address at the end of the first chip select frame is less than the end register address, automatically incrementing, by the slave device, the register address at a next chip select frame in order to perform automatic register address incrementation across the first and the next chip select frames; and on a second condition that the end-of-frame register address at the end of the first chip select frame is equal to or greater than the end register address, and stopping, by the slave device, the read out operation.

One or more embodiments provide a serial peripheral interface (SPI) communication system, including a slave device. The slave device includes: a data register configured with a start register address and an end register address that define a register address range for a write operation; a chip select terminal configured to receive a chip select signal including an active signal level and an idle signal level that define a plurality of chip select frames, wherein an end of each chip select frame is defined by an idle signal edge that is a transition from the active signal level to the idle signal level; and a serial data input (SDI) terminal configured to receive a master out, slave in (MOSI) signal, wherein the MOSI signal includes configuration information received in a first chip select frame to start the write operation and data portions received during the write operation, wherein each data portion is sequentially written to a different register address of the data register. The slave device is configured to: during the first chip select frame, increment a register address to correspond to each memory location sequentially written to the data register, at an end of the first chip select frame, demarked by an idle signal edge of the chip select signal, compare an end-of-frame register address with the end register address, on a first condition that the end-of-frame register address at the end of the first chip select frame is less than the end register address, automatically increment the register address at a next chip select frame in order to perform automatic register address incrementation across the first and the next chip select frames, and on a second condition that the end-of-frame register address at the end of the first chip select frame is equal to or greater than the end register address, stop the write operation.

One or more embodiments provide a method of performing serial peripheral interface (SPI) communication with a slave device including a data register configured with a start register address and an end register address that define a register address range for a write operation. The method includes: receiving, by the slave device, a chip select signal including an active signal level and an idle signal level that define a plurality of chip select frames, wherein an end of each chip select frame is defined by an idle signal edge that is a transition from the active signal level to the idle signal level; receiving, by the slave device, a master out, slave in (MOSI) signal, wherein the MOSI signal includes configuration information received in a first chip select frame to start the write operation and data portions received during the write operation, wherein each data portion is sequentially written to a different register address of the data register; during the first chip select frame, incrementing, by the slave device, a register address to correspond to each memory location sequentially written to the data register; at an end of the first chip select frame, demarked by an idle signal edge of the chip select signal, comparing, by the slave device, an end-of-frame register address with the end register address; on a first condition that the end-of-frame register address at the end of the first chip select frame is less than the end register address, automatically incrementing, by the slave device, the register address at a next chip select frame in order to perform automatic register address incrementation across the first and the next chip select frames; and on a second condition that the end-of-frame register address at the end of the first chip select frame is equal to or greater than the end register address, and stopping, by the slave device, the write operation.

One or more embodiments provide a slave device of a serial peripheral interface (SPI) communication system, the slave device including: a data register configured with a start register address and an end register address that define a register address range for a data operation; a chip select terminal configured to receive a chip select signal including an active signal level and an idle signal level that define a plurality of chip select frames, wherein an end of each chip select frame is defined by an idle signal edge that is a transition from the active signal level to the idle signal level; a serial data input (SDI) terminal configured to receive a master out, slave in (MOSI) signal, wherein the MOSI signal includes configuration information received in a first chip select frame of the data operation, wherein the configuration information includes an operation command bit indicating whether the data operation is a write operation or a read out operation and an auto-incrementation control bit indicating whether automatic register address incrementation across chip select frames is enabled or disabled; a serial data output (SDO) terminal configured to transmit a master in, slave out (MISO) signal; and at least one processor configured to enable and disable automatic register address incrementation across chip select frames based on the auto-incrementation control bit.

One or more embodiments provide a master device of a serial peripheral interface (SPI) communication system, the master device including: a chip select terminal configured to transmit a chip select signal including an active signal level and an idle signal level that define a plurality of chip select frames, wherein an end of each chip select frame is defined by an idle signal edge that is a transition from the active signal level to the idle signal level; and a master out, slave in (MOSI) terminal configured to transmit a MOSI signal to a slave device, wherein the MOSI signal includes configuration information transmitted in a first chip select frame of a data operation, wherein the configuration information includes an operation command bit indicating whether the data operation is a write operation or a read out operation and an auto-incrementation control bit indicating whether automatic register address incrementation across chip select frames is enabled or disabled.

BRIEF DESCRIPTION OF THE DRAWINGS

Embodiments are described herein making reference to the appended drawings.

DETAILED DESCRIPTION

Figure 1:
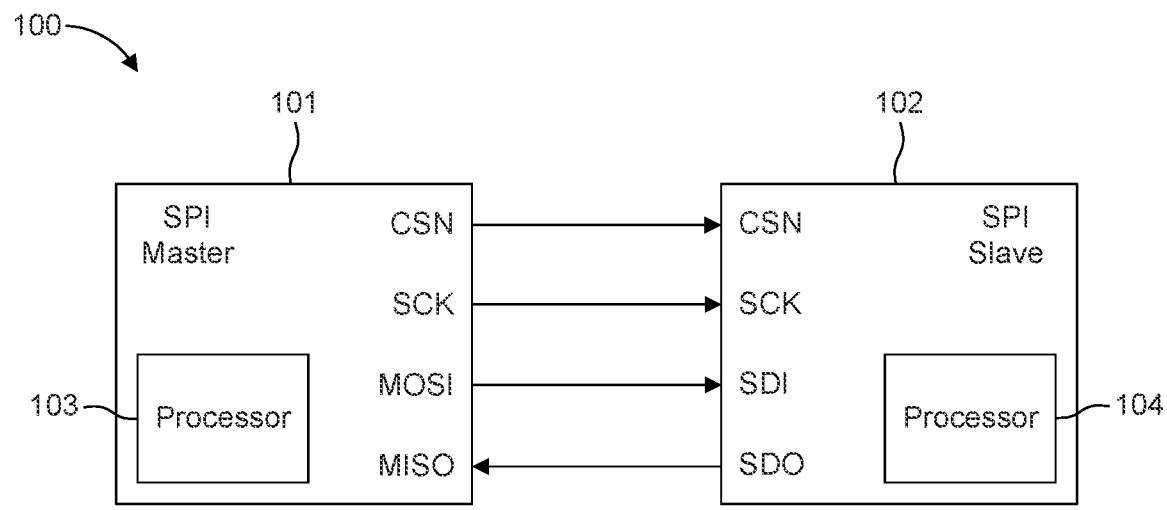
FIG. 1 is a schematic block diagram of a Serial Peripheral Interface (SPI) communication system according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

FIG. 1 is a schematic block diagram of a Serial Peripheral Interface (SPI) communication system 100 according to one or more embodiments. The SPI communication system 100 includes an SPI master device 101, such as a microcontroller, and a SPI slave device 102, such as a shift register, a sensor, an ADC, a DAC, a memory device (e.g., a memory card), or other peripheral device. The SPI slave device 102 can be any integrated circuit (i.e., chip) comprising a data register and capable performing data operations (e.g., read and write operations) from/to the data register at the control of the SPI master device 101. Here, a read operation is a data transmission originating at the SPI slave device 102 and terminating at the SPI master device 101 and a write operation is a data transmission originating at the SPI master device 101 and terminating at the SPI slave device 102. The master and slave devices each include at least one processor for performing their data operations.

The master and slave devices both include an SPI clock (SCK) terminal connected by a clock signal line. The device that generates the clock signal SCK is called the master. Data transmitted between the master and the slave is synchronized to the clock generated by the master. During SPI communication, the data is simultaneously transmitted (shifted out serially onto the MOSI/SDI bus) and received (the data on the bus (MISO/SDO) is sampled or read in). The serial clock edge synchronizes the shifting and sampling of the data. The SPI interface provides the user with flexibility to select the rising or falling edge of the clock to sample and/or shift the data. Each clock cycle represents a bit.

For example, data present at Serial Data Input (SDI) may be latched on the rising edge of the clock signal SCK and data on Serial Data Out (SDO) may be shifted out at the falling edge of clock signal SCK. The SDI is a data input terminal of the slave device 102 and is connected to the master out, slave in (MOSI) terminal of the master device 101 by a data line. The master device 101 transmits information, including control information and data, to the slave device 102 via its MOSI terminal. The SDI terminal is used to transfer data serially into the slave device. It receives the data to be written. The SDO is a data output terminal of the slave device 102 and is connected to the master in, slave out (MISO) terminal of the master device 101 by a data line. The master device 101 receives (reads) information, from the slave device 102 via its MISO terminal. The SDO terminal is used to transfer data serially out of the slave device. It transmits the data to be read.

Chip Select Not (CSN): when this input signal is High, the device is not selected and Serial Data Output (SDO) is high impedance. Driving this input Low enables the communication. The communication must start and stop on a Low level of Serial Clock (SCK).

The master and slave devices both include a chip select terminal connected by a select signal line. Here, the chip select terminal is a chip select not (CSN) terminal, meaning that the chip select signal is an active low signal. The chip select signal is transmitted from the master device 101 and is used to select and/or enable the slave device 102 for SPI communication. The chip select signal is low when communication with the slave device 102 is enabled and is pulled high to disconnect the slave device 102 from the SPI bus, thereby disabling communication with the slave device 102. More particularly, when the chip select signal is pulled high, the SDO terminal is placed in high impedance. Driving this input low enables the communication. Thus, the master device 101 must send a logic 0 on this CSN signal to select the slave device 102. SPI is a full-duplex interface; both master and slave can send data at the same time via the MOSI and MISO data lines respectively.

An SPI communication frame (i.e., a CSN frame) is defined by an interval during which the CSN signal is low (logic 0) between two consecutive high (logic 1) signal levels. Thus, a falling edge of the CSN signal from high-to-low denotes a start of a CSN frame and the next edge (i.e., a rising edge) from low-to-high denotes an end of the CSN frame. Each CSN frame is a predetermined number of clock cycles in length corresponding to the number of bytes of the SPI buffer. For example, for an x-byte SPI buffer, each CSN frame is x-bytes in length, where x is an integer greater than one. Two consecutive CSN frames are separated by an idle period during which the CSN signal is high (logic 1) and communication from the slave device 102 is disabled.

The master device 101 includes at least one processor 103 and/or processing circuitry that performs the functions of the master device 101 described herein for performing SPI communications, including signal generation (e.g., CSN, SCK, and MOSI signals) including synchronization and control of the slave device 101, signal reception (e.g., MISO signals) and the processing thereof, data sampling in from the MISO data line, shifting data out onto the MOSI signal line, register address incrementation and tracking, register address evaluation, and automatic register address incrementation across SPI data (communication) frames, including the enabling and disabling thereof.

Similarly, the slave device 102 includes at least one processor 104 and/or processing circuitry that performs the functions of the slave device 102 described herein for performing SPI communications, including signal generation (e.g., MISO signals), signal reception (e.g., CSN, SCK, and MOSI signals) and the processing thereof, data sampling in from the MOSI data line, shifting data out onto the MISO data line, register address incrementation and tracking, register address evaluation, and automatic register address incrementation across SPI data (communication) frames based on whether or not it is enabled by the master device 101.

Figure 2:
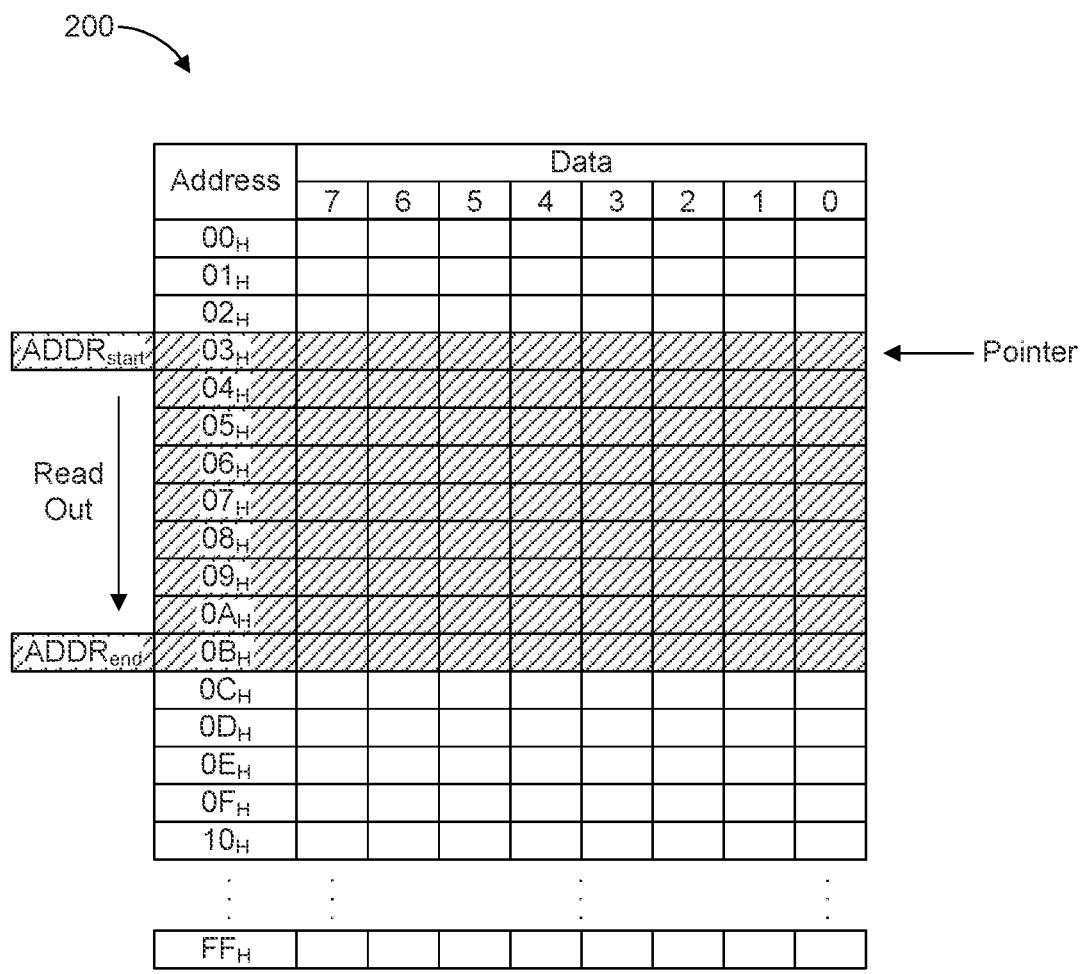
FIG. 2 is a memory of a slave device according to one or more embodiments.

FIG. 2 is a memory 200 of a slave device according to one or more embodiments. The memory 200 may be a Memory Data Register (MDR) or a Memory Buffer Register (MBR) and represents a list of registers (i.e., memory locations) accessible from the SPI communication interface bus. Here, the memory includes a predefined number of register addresses ranging from $00_H$ to $FF_H$, with each address storing eight data bits 0-7 (i.e., a byte). However, each register address could contain more than one byte. For example, each memory location could be 8 bytes, 16 bytes, 32 bytes, etc. The slave device 102 is predefined (e.g., hardware coded) or configurable by the microcontroller with a designated register address range from "ADDRstart" to "ADDRend". The designated register address range is a range of register addresses from which data is to be read out for each readout request or command made by the master device 101. Upon receiving a readout request, the slave device 102 starts reading out data from the data register 200 starting at the start register address ADDRstart and sequentially reads out data from the subsequent register addresses moving towards the end register address ADDRend.

A register address range with start and end register addresses may also be configured for a write operation. Thus, when pertaining to a specific read or write operation, the two register address ranges can be referred to as a read register address range and a write register address range. Otherwise, they may be generally referred to as register address ranges.

The start register address ADDRstart can be defined by the master device 101 in command transmitted at the start of an SPI communication with the slave device 102. The end register address ADDRend can be defined by the master device 101 in a same or second command transmitted at the start of an SPI communication with the slave device 102 (i.e., in the first frame) or in a subsequent frame. Here, the start register address ADDRstart is transmitted first so that data readout or data write can begin.

Alternatively, the start register address ADDRstart can be defined by the master device 101 in a command transmitted at the start of an SPI communication with the slave device 102 and the end register address ADDRend can be predefined within the communication protocol to be a predefined number of addresses from the start register address ADDRstart. In other words, the size of the register address range for data read out or data write may be predefined (i.e., fixed in the register map) at the master and slave devices by the communication protocol where only the start register address ADDRstart is required to be transmitted at the start of the communication to configure the same.

Alternatively, both the start register address ADDRstart and the end register address ADDRend can be predefined by the communication protocol. Thus, the start register address ADDRstart and the end register address ADDRend of the read register address range is fixed in the register map for all data read outs and the start register address ADDRstart and the end register address ADDRend of the write register address range is fixed in the register map for all data writes.

The following embodiments are directed to automatic register address incrementation across SPI (communication) frames, and more specifically across chip select frames, which may be used for a single read operation defined by a read register address range or single write operation defined by a write register address range. For example, if during a read operation the slave device 102 does not read out from the end register address ADDRend during a current chip select frame (e.g., a CSN frame), the slave device 102 continues the read out operation at the next chip select frame by automatically incrementing to the next register address within the read register address range to start the next chip select frame without receiving any configuration information, such as a start register address, from the master device 101. Similarly, if during a write operation the master device 101 does not write to the end register address ADDRend during a current chip select frame (e.g., a CSN frame), the master device 100 continues the write operation at the next chip select frame by automatically incrementing its address pointer or counter to the next register address (i.e., the next memory location) within the write register address range to start the next chip select frame without transmitting any configuration information, such as a start register address, to the slave device 102. In the following examples, the master device 101 is a microcontroller and the slave device 102 is a sensor. However, the slave device 102 can be any peripheral device defined above.

Figure 3:
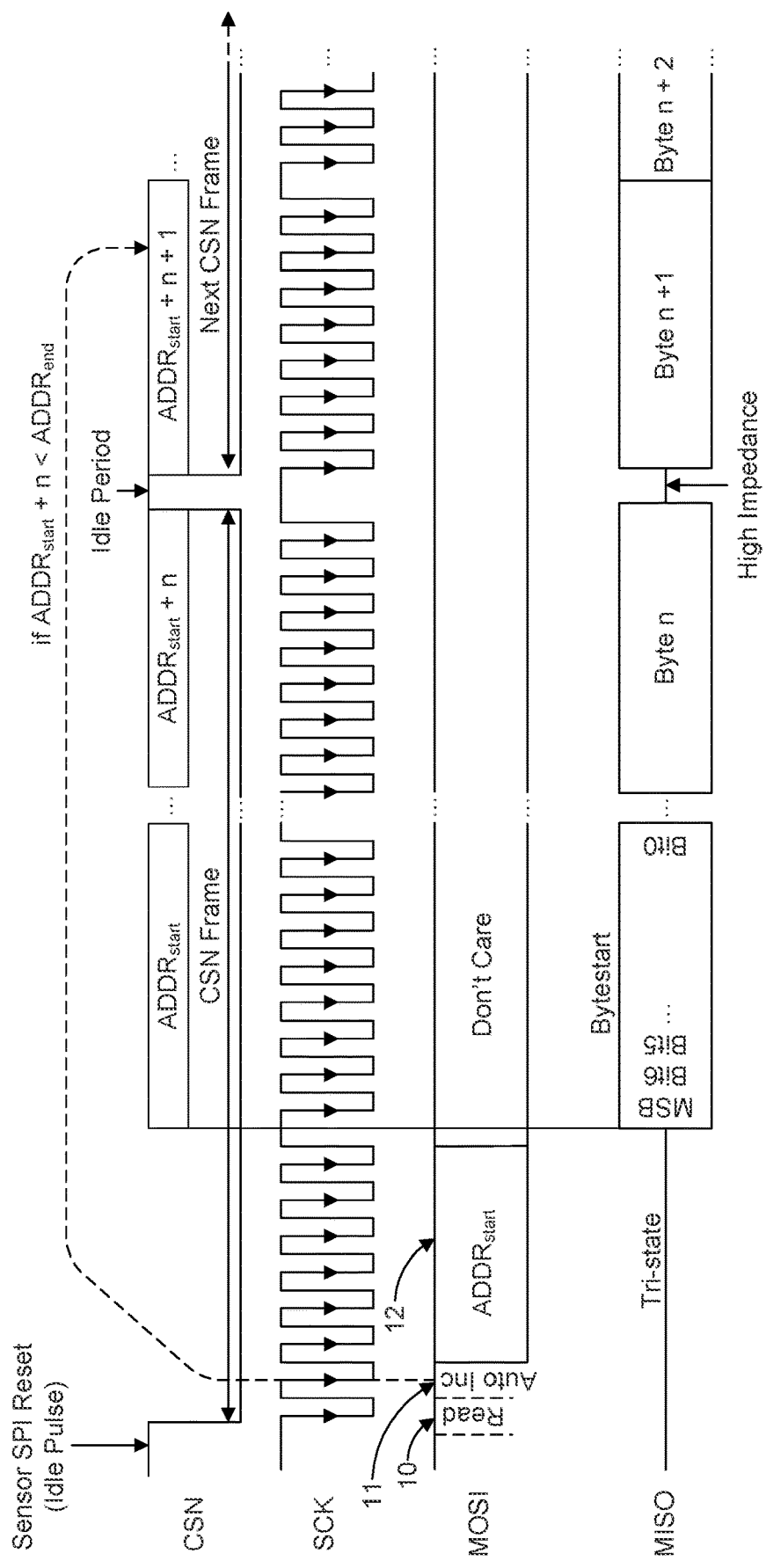
FIG. 3 is a signal diagram for signals transmitted between a master device and a slave device using automatic register address incrementation for a read out operation according to one or more embodiments.

FIG. 3 is a signal diagram for signals transmitted between a master device and a slave device using automatic register address incrementation for a read out operation according to one or more embodiments. The signals include chip select signal CSN, clock signal SCK, MOSI signal, and MISO signal.

The chip select signal CSN defines the chip select frames (e.g., a CSN frames) of SPI communication. The chip select signal CSN is has a first signal level (active signal level, logic 0) that indicates that a particular slave is selected by the master for communication and has a second signal level (idle signal level, logic 1) that indicates that communication with this particular slave is idle or inactive. Each chip select frame is defined by an interval (e.g., a time interval or signal interval) between two consecutive signal edges of the chip select signal CSN during which the chip select signal CSN has the first signal level. Each chip select frame is separated from an adjacent chip select frame by an idle interval defined by the idle signal level of the chip select signal CSN. An idle signal level of the chip select signal CSN may represent a sensor SPI reset and/or an idle period during which the communication from the slave device 102 is disabled. In other words, the SDO terminal is placed in high impedance. The idle signal level triggers a sensor SPI reset when the slave device 102 determines that a read or write operation has been fulfilled. Since an idle signal level always results in an idle period, a transition from the active signal level to the idle signal level may be referred to as an idle signal edge that triggers the SPI communication with the slave device 102 to be idled or stopped.

MISO data frames and MOSI data frames are synchronized with the chip select frames, in which data portions or a respective data frame are transmitted by master devise 101 or the slave device 102. For example, a first MISO data frame on the MISO signal for a read out operation is synchronized with the first chip select frame of the chip select signal CSN. During the first MISO data frame, one or more data portions (e.g., bytes) can be read out from the slave's data register 200. Further MISO data frames are each synchronized with a respective further chip select frame. Likewise, a first MOSI data frame on the MOSI signal for a data operation is synchronized with the first chip select frame of the chip select signal CSN. During the first MISO data frame, one or more configuration information portions and data portions (e.g., bytes) can be transmitted from the master device 101. Further MOSI data frames are each synchronized with a respective further chip select frame.

In general, the master device 101 transmits a command byte that includes a start register address (i.e., an address byte) to the slave indicating from which slave register address the slave is to start reading out data for the master's read operation or a slave register address starting with which the master is to write data to the slave. The slave must wait for the start register address before it can start transmitting data from its register to the master or before it can start receiving write data from the master. Commands and other information provided in the command byte or other command bits may generally be referred to as configuration information.

To start a read out operation, the MOSI signal includes an operation command bit 10 and an auto-incrementation control bit 11. In particular, the master device 101 uses the operation command bit 10 to define the SPI operation as a write operation (e.g., logic 0) or a read operation (e.g., logic 1). In this case, the master device 101 is using the operation command bit 10 to configure the slave device 102 for a read operation. In addition, the master device 101 uses the auto-incrementation control bit 11 to either enable (e.g., logic 1) or disable (e.g., logic 0) the auto-incrementation function for the read/write operation. If enabled, the slave device 102 is configured to perform automatic register address incrementation across SPI data (communication) frames for the read/write operation. If disabled, the slave device 102 is configured to not perform automatic register address incrementation across SPI data (communication) frames for the read/write operation.

To start the read out operation, the MOSI signal may also include a start register address command byte 12, which defines the start register address ADDRstart of the slave device's register from which the read out operation is to start. The end register address ADDRend of the slave device's register is also defined according to one of the aforementioned options. In this case, the end register address ADDRend is defined by a predefined register address range. The start register address command byte 12 is followed by a "don't care" period of the MOSI signal that is not relevant to automatic register address incrementation across SPI data (communication) frames.

The MISO signal is a tri-state data (read out) signal which allows the MISO signal to assume a high impendence state during idle periods when the chip select signal CSN is high. During a read operation when the chip select signal CSN is low, the MISO signal switches between 0 and 1 logic states according to the data bits being read out from its register, with each bit synchronized to a clock cycle of the clock signal SCK.

The slave device 102 starts reading out data (byte$_{start}$ corresponding to ADDRstart) via the MISO signal from its start register address ADDRstart after being configured by the master device 101 (i.e., after being configured by the operation command bit 10, the auto-incrementation control bit 11, and the start register address command byte 12).

The slave device 102 increments its address pointer for its read out address to sequentially read data out data (e.g., for each memory location accessed) from its register starting at the start register address ADDRstart towards its end register address ADDRend. Thus, byte$_{start}$, byte n, byte n+1, byte n+2, and so on are sequentially read out for the read operation, each byte corresponding to a register address of the slave device 102.

At the end of the chip select frame (e.g., the first chip select frame of a read operation), the slave device 102 may have read out from register address ADDRstart+n, where n is an integer equal to or greater than zero. At this time, the low-to-high signal edge (i.e., the idle signal edge) of the chip select signal CSN demarking the end of the chip select frame triggers a register address evaluation to be performed by the slave device 102. For the evaluation, the slave device 102 compares the register address at which its address pointer is pointing when the idle signal edge is triggered to the end register address ADDRend. In other words, the slave device 102 determines whether its address pointer is upstream from the end register address ADDRend (i.e., has not yet reached or is less than the end register address ADDRend), at or equal to the end register address ADDRend, or downstream from the end register address ADDRend (i.e., has exceeded, passed, or is greater than the end register address ADDRend).

If the register address ADDRstart+n is less than the end register address ADDRend, the slave device 102 automatically increments to the next register address within the register address range and automatically continues to read out from its register in the next chip select frame. In other words, the slave device 102 automatically continues the read out operation in the next chip select frame by incrementing from ADDRstart+n to ADDRstart+n+1. The slave device 102 does this without receiving any additional configuration information from the master device 101.

The incrementation continues within the next chip select frame until the end of the next chip select frame, when again the slave device 102 compares the last read out register address of that chip select frame with the end register address ADDRend. If the last read out register address is less than the end register address ADDRend, the slave device 102 automatically continues the read out operation in the next chip select frame by incrementing to the next register address in the next further chip select frame. Again, it does this without receiving any additional configuration information from the master device 101.

However, if the last read out register address (e.g., ADDRstart+n) is equal to or greater than the end register address ADDRend, the slave device 102 determines that the read operation has been fulfilled (completed), stops the read out operation, and resets. In this case, the logic high signal edge of the chip select signal CSN is treated as an SPI reset signal edge. As a result, the slave device 102 waits for further instruction from the master device 101 to perform a new read out operation or a new write operation. To start a new read/write operation with the slave device 102, the master device 101 must transmit configuration information, including an operation command bit 10, an auto-incrementation control bit 11, and a start register address command byte 12.

Thus, the slave device 102 performs register address evaluation at the end of each chip select frame. If the slave device 102 has not yet reached or surpassed the end register address ADDRend, the slave device 102 continues the same read out operation by automatically incrementing to the next register address for reading out data in the next chip select frame. In contrast, if the slave device 102 has reached or surpassed the end register address ADDRend, the slave device 102 stops the read out operation, stops incrementing its address pointer, and resets to wait for the next instruction from the master device 102.

The last register address of a chip select frame is a register address last read out from or written to during the chip select frame prior to the idle signal edge of the chip select signal CSN that demarks the end of the chip select frame. In other words, it is the register address (i.e., which memory location) an address pointer is pointing to when the idle signal edge of the chip select signal CSN is transmitted or received. The last register address may also be referred to an end-of-frame register address.

Figure 4:
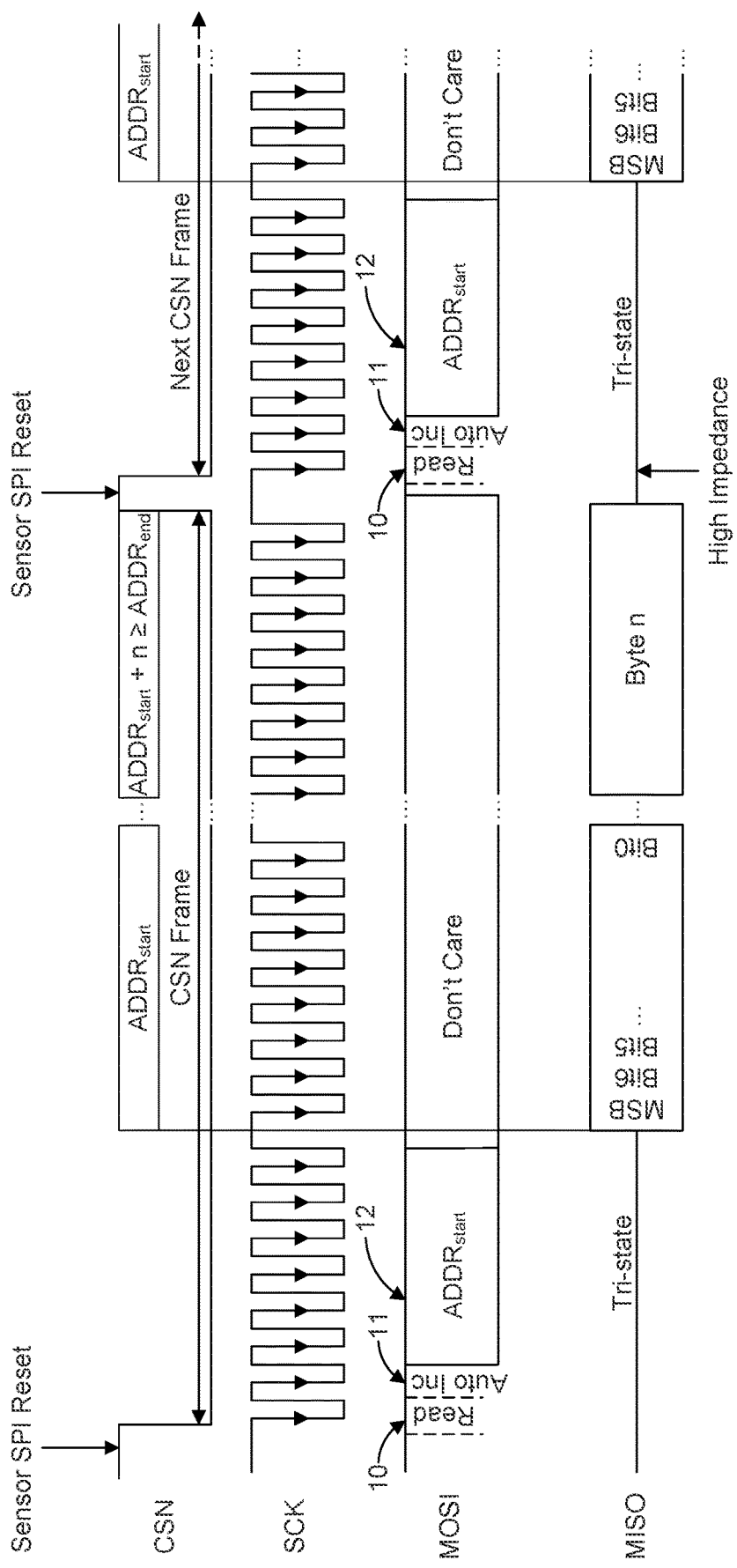
FIG. 4 is a signal diagram for signals transmitted between a master device and a slave device using automatic register address incrementation for a read out operation according to one or more embodiments.

FIG. 4 is a signal diagram for signals transmitted between a master device and a slave device using automatic register address incrementation for a read out operation according to one or more embodiments. Similar to the signals illustrated in FIG. 3, the signals include chip select signal CSN, clock signal SCK, MOSI signal, and MISO signal are shown with the operation command bit 10 indicating a read operation, the auto-incrementation control bit 11 enabling auto-incrementation across chip select frames (e.g., CSN frames), and the start register address command byte 12 identifying the start register address ADDRstart.

Like in FIG. 3, the idle signal edge or idle signal level of the chip select signal CSN triggers a register address evaluation to be performed by the slave device 102. However, in this case, the last read out register address ADDRstart+n is equal to or greater than the end register address ADDRend. Accordingly, the idle signal edge or idle signal level of the chip select signal CSN triggers the slave device 102 to reset and terminate the read out operation and the incrementation of its register. The master device 101 sends new configuration information, including an operation command bit 10, an auto-incrementation control bit 11, and a start register address command byte 12, to start a new read out operation. The start register address command byte 12 for the new read out operation may be the same or a different address compared to the start register address of the previous read out operation.

Figure 5:
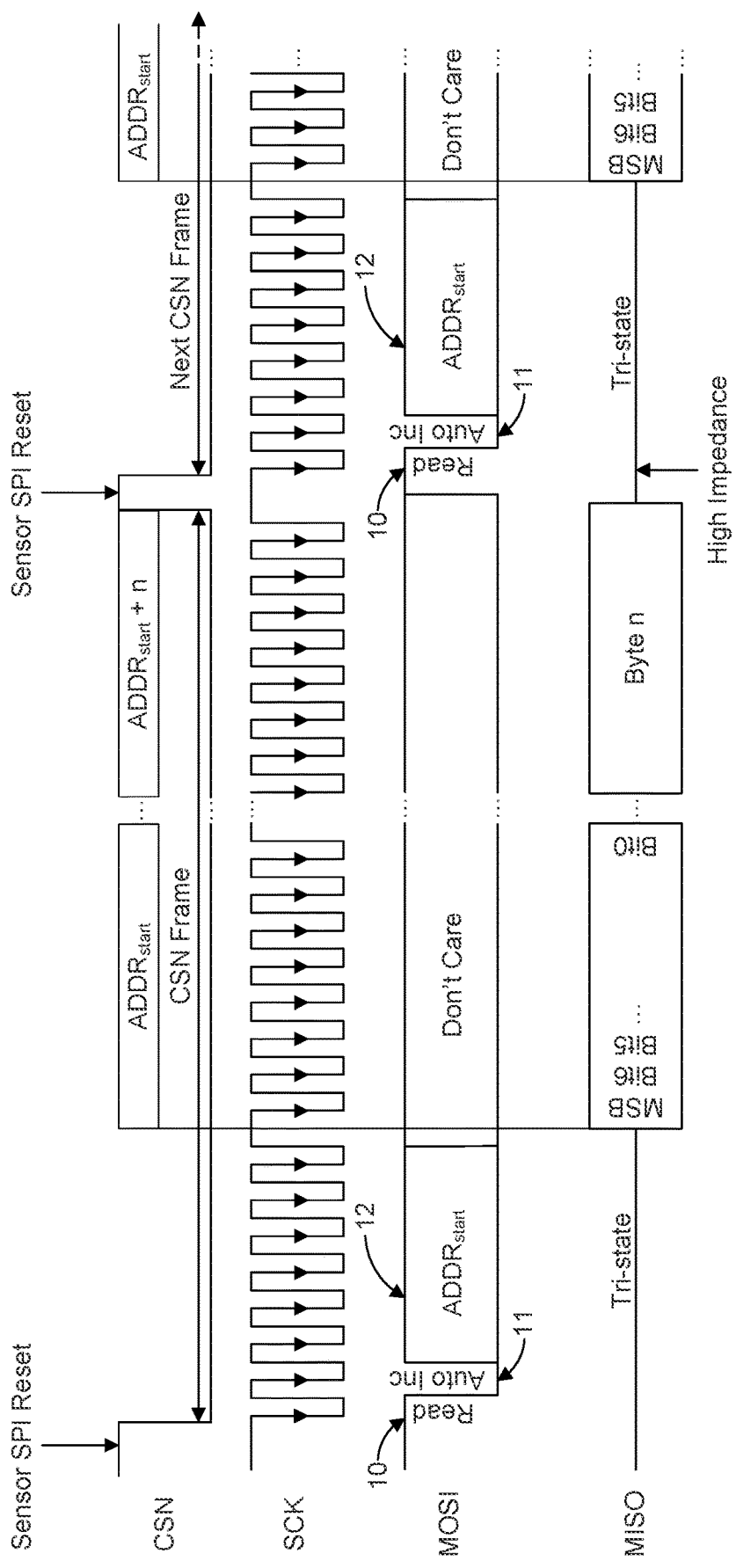
FIG. 5 is a signal diagram for signals transmitted between a master device and a slave device while automatic register address incrementation for a read out operation is disabled according to one or more embodiments.

FIG. 5 is a signal diagram for signals transmitted between a master device and a slave device while automatic register address incrementation for a read out operation is disabled according to one or more embodiments. Similar to the signals illustrated in FIG. 3, the signals include chip select signal CSN, clock signal SCK, MOSI signal, and MISO signal. The operation command bit 10 indicates a read operation, and the start register address command byte 12 identifies the start register address ADDRstart. However, the auto-incrementation control bit 11, being logic 0, disables auto-incrementation across chip select frames (e.g., CSN frames). As a result, the slave device 102 does not perform a register address evaluation at the end of a chip select frame (e.g., the CSN frame). Instead, the read out operation is automatically terminated and the slave device 102 is reset by the idle signal edge or idle signal level (i.e., the sensor SPI reset). This requires new configuration information 10, 11, and 12 to be received by the slave device 102 before performing another communication operation, such as a read or a write operation. As shown here, the master device 101 initializes another read operation at the start of the next chip select frame by driving the chip select signal CSN low as well as by transmitting configuration information 10, 11, and 12.

Figure 6:
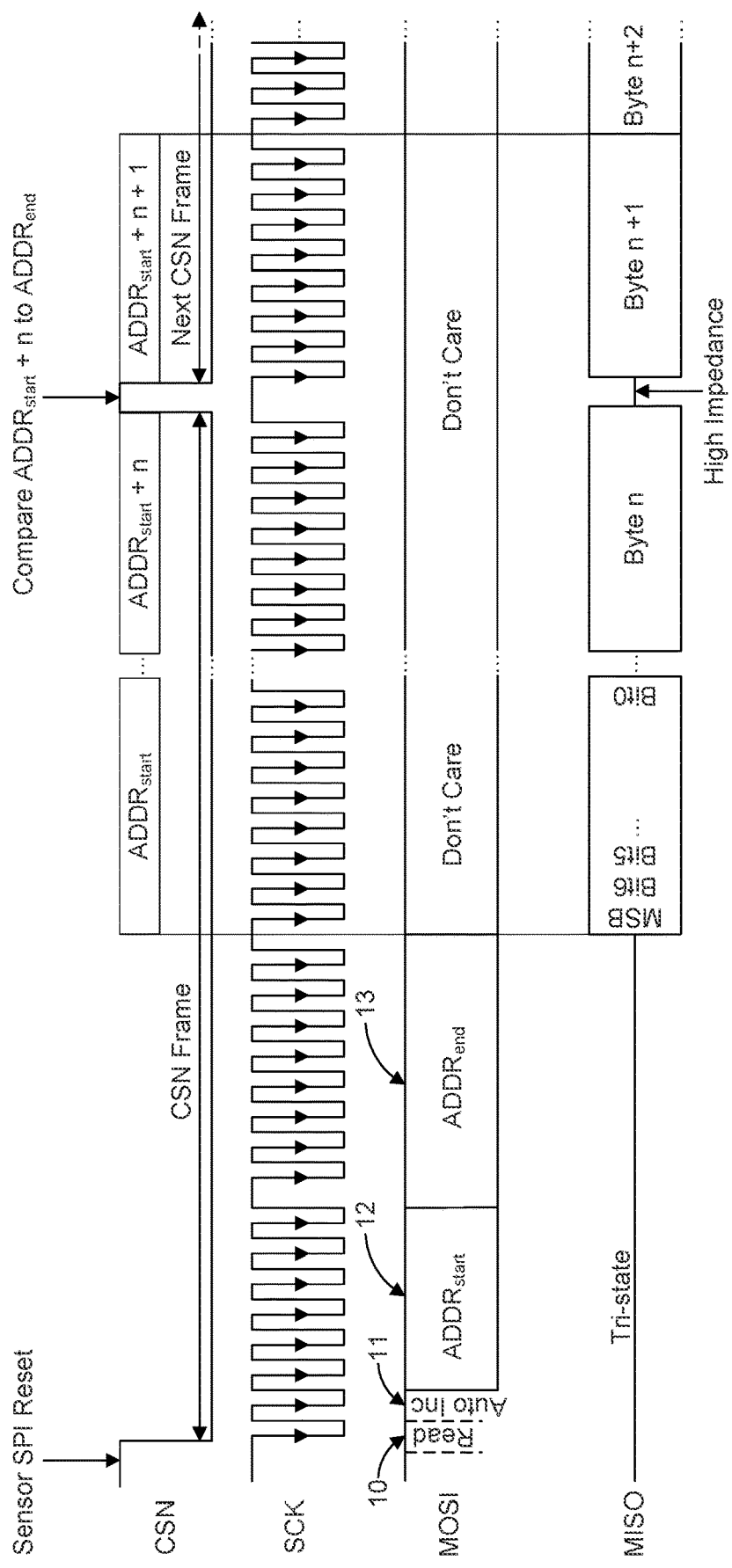
FIG. 6 is a signal diagram for signals transmitted between a master device and a slave device using automatic register address incrementation for a read out operation according to one or more embodiments.

FIG. 6 is a signal diagram for signals transmitted between a master device and a slave device using automatic register address incrementation for a read out operation according to one or more embodiments. Similar to the signals illustrated in FIG. 3, the signals include chip select signal CSN, clock signal SCK, MOSI signal, and MISO signal. The configuration information in this case includes the operation command bit 10 indicating a read operation, the auto-incrementation control bit 11 enabling auto-incrementation across chip select frames (e.g., CSN frames), and the start register address command byte 12 identifying the start register address ADDRstart. In addition, the configuration information further includes an end register address command byte 13 that defines the end register address ADDRend of the slave device's register for the read out operation. It is also the register address that the slave device 102 uses to perform the register address evaluation at the end of each chip select frame of the read out operation. As described above, the slave device 102 compares the last read out register address of each chip select frame with the end register address ADDRend and determines whether the read out operation has been fulfilled or not based on the comparison result. If the last read out register address of a chip select frame is less than the end register address ADDRend, the read out operation has not been fulfilled and the slave device 102 automatically increments its address pointer to the next register address (i.e., next memory location) for the next chip select frame. If the last read out register address of a chip select frame is equal to or greater than the end register address ADDRend, the read out operation has been fulfilled and the slave device 102 resets for the next read or write operation. In this case, the slave device 102 determined that the read out operation has not been fulfilled and continues the address incrementation across the chip select frames.

It is noted that in the examples illustrated in FIGS. 3-6, the master device 101 also monitors and tracks when configuration information needs to be transmitted based on its knowledge of the register address range, including start and end register addresses, the total number of bytes received in the MISO signal in the chip select frame(s) for the read out operation, the timing of the idle signal edge of the chip select signal CSN or the size of the chip select frame, and whether or not the auto-incrementation control bit 11 has been enabled or disabled. Thus, the master device 101 also determines when automatic incrementation is implemented across chip select frames and when a read out operation has been fulfilled at the end of a chip select frame based on performing its own register address evaluation at the end of each chip select frame.

Figure 7:
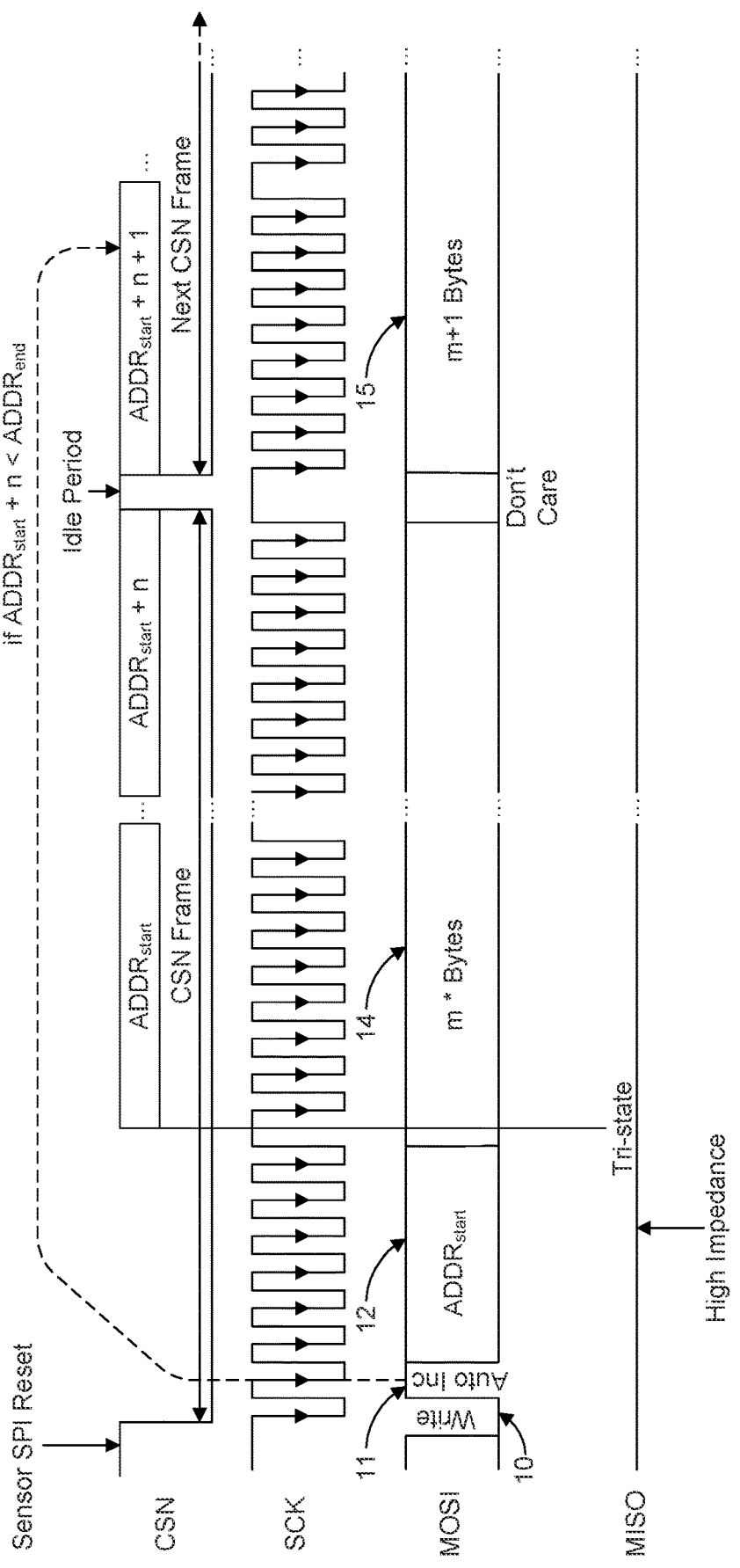
FIG. 7 is a signal diagram for signals transmitted between a master device and a slave device using automatic register address incrementation for a write operation according to one or more embodiments.

FIG. 7 is a signal diagram for signals transmitted between a master device and a slave device using automatic register address incrementation for a write operation according to one or more embodiments. Similar to the signals illustrated in FIG. 3, the signals include chip select signal CSN, clock signal SCK, MOSI signal, and MISO signal. However, the configuration information in this case includes the operation command bit 10 indicating a write operation (logic 0). The auto-incrementation control bit 11 enables auto-incrementation across chip select frames (e.g., CSN frames) and the start register address command byte 12 identifies the start register address ADDRstart of the slave device's data register (e.g., data register 200) to which the first byte from the master device is to be written. Because the master device 101 signals a write operation, the MISO signal remains in a high impedance state and data read out is not performed by the slave device 102.

Upon transmitting the configuration information, the master device 101 starts to transmit the data from its data register via the MOSI signal to the slave device 102. In this example, the master device 101 transmits a data portion 14 comprising m bytes to complete the first chip select frame, where m is an integer greater than zero.

The master device 101 increments its address pointer for its read out address to sequentially write data from its data register starting at a start register address for a write register address range. Similarly, the slave device increments its address pointer for its write register for each byte received from or each memory location accessed by the master device 101, starting at the start register address ADDRstart of its write register.

At the end of each chip select frame, both the master device 101 and the slave device 102 perform a register address evaluation, triggered by the idle signal edge of the chip select signal CSN that indicates the end of a current chip select frame. The register address evaluation is performed at each device to determine whether the write operation has been fulfilled at the end of a current chip select frame.

The master device 101 device compares its pointer position to the end register address of its write register address range, much like it did for its read register address range for a read out operation. If the pointer position corresponding to the last write register address of a current chip select frame is less than the end register address, the write operation continues in the next chip select frame by automatically incrementing to the next register address in its write register address range. Thus, the master device 101 automatically continues the write operation across chip select frames without transmitting configuration information in subsequent chip select frames.

Advantageously, it can be seen that for the next chip select frame the master device 101 transmits a data portion 15 comprising m+1 bytes to the slave device 102. In other words, the master device is able to transit at least one additional data byte in subsequent chip select frames when compared to data portion 14 transmitted in the first chip select frame of the write operation. This is because the configuration information (e.g., a command byte) that requires at least a byte of bandwidth is not needed for subsequent chip select frames of a same operation and can be allocated (repurposed) to transmitting data instead.

However, if the pointer position corresponding to the last write register address of a current chip select frame is equal to or greater than the end register address, the write operation is fulfilled and is completed. Auto-incrementation is not performed for the next chip select frame, but instead new configuration information is needed to configure the slave device 102 for a new read or write operation that is separate and distinct from the previous (completed) write operation.

Similarly, the slave device 102 increments its address pointer for its write register address to sequentially write data to its write register starting at the start register address ADDRstart towards its end register address ADDRend.

At the end of the chip select frame (e.g., the first chip select frame of a write operation), the slave device 102 may have written to register address ADDRstart+n, where n is an integer equal to or greater than zero. At this time, the idle signal edge of the chip select signal CSN demarking the end of the chip select frame triggers a register address evaluation to be performed by the slave device 102. For the evaluation, the slave device 102 compares the register address at which its address pointer is pointing when the idle signal edge or idle signal level is triggered to the end register address ADDRend. In other words, the slave device 102 determines whether its address pointer is upstream from the end register address ADDRend (i.e., has not yet reached or is less than the end register address ADDRend), at or equal to the end register address ADDRend, or downstream from the end register address ADDRend (i.e., has exceeded, passed, or is greater than the end register address ADDRend).

If the register address ADDRstart+n is less than the end register address ADDRend, the slave device 102 automatically increments to the next register address within the register address range and automatically continues to write to its register in the next chip select frame. In other words, the slave device 102 automatically continues the write operation in the next chip select frame by incrementing from ADDRstart+n to ADDRstart+n+1. The slave device 102 does this without receiving any additional configuration information from the master device 101.

The incrementation continues within the next chip select frame until the end of the next chip select frame, when again the slave device 102 compares the last write register address of that chip select frame with the end register address ADDRend. If the last write register address is less than the end register address ADDRend, the slave device 102 automatically continues the write operation in the next chip select frame by incrementing to the next register address in the next further chip select frame. Again, it does this without receiving any additional configuration information from the master device 101.

However, if the last write register address (e.g., ADDRstart+n) is equal to or greater than the end register address ADDRend, the slave device 102 determines that the write operation has been fulfilled (completed), stops the write operation, and resets. In this case, the idle signal edge or idle signal level of the chip select signal CSN is treated as an SPI reset signal edge. As a result, the slave device 102 waits for further instruction from the master device 101 to perform a new read out operation or a new write operation. To start a new read/write operation with the slave device 102, the master device 101 must transmit configuration information, including an operation command bit 10, an auto-incrementation control bit 11, and a start register address command byte 12.

Thus, the slave device 102 performs register address evaluation at the end of each chip select frame. If the slave device 102 has not yet reached or surpassed the end register address ADDRend, the slave device 102 continues the same write operation by automatically incrementing to the next register address for writing data in the next chip select frame. In contrast, if the slave device 102 has reached or surpassed the end register address ADDRend, the slave device 102 stops the write operation, stops incrementing its address pointer, and resets to wait for the next instruction from the master device 102.

While various embodiments have been disclosed, it will be apparent to those skilled in the art that various changes and modifications can be made which will achieve some of the advantages of the concepts disclosed herein without departing from the spirit and scope of the invention. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent on the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof, including any combination of a computing system, an integrated circuit, and a computer program on a non-transitory computer-readable recording medium. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments, a single act may include or may be broken into multiple sub acts. Such sub acts may be included and part of the disclosure of this single act unless explicitly excluded.

What is claimed is:

1. A serial peripheral interface (SPI) communication system, comprising:
a slave device comprising:
a memory configured with a start register address and an end register address that define a register address range for a read out operation;
a chip select terminal configured to receive a chip select signal comprising an active signal level and an idle signal level that define a plurality of chip select frames, wherein an end of each chip select frame is defined by an idle signal edge that is a transition from the active signal level to the idle signal level;
a serial data input (SDI) terminal configured to receive a master out, slave in (MOSI) signal, wherein the MOSI signal includes first configuration information received in a first chip select frame to start the read out operation; and
a serial data output (SDO) terminal configured to transmit a master in, slave out (MISO) signal comprising data portions during the read out operation, wherein each data portion is sequentially read out from a different register address of the memory;
wherein the slave device is configured to:
during an interval defined by the first chip select frame, increment a register address to correspond to each memory location sequentially read out from the memory,
at an end of the first chip select frame, demarked by the idle signal edge of the chip select signal, compare an end-of-frame register address with the end register address,
on a first condition that the end-of-frame register address at the end of the first chip select frame is less than the end register address, automatically increment the register address at a next chip select frame in order to perform automatic register address incrementation across the first and the next chip select frames, and
on a second condition that the end-of-frame register address at the end of the first chip select frame is equal to or greater than the end register address, stop the read out operation.

2. The SPI communication system of claim 1, wherein:
if the first condition is satisfied, the slave device is configured to automatically increment the register address at a start of the next chip select frame without receiving a command in the next chip select frame.

3. The SPI communication system of claim 1, wherein:
if the first condition is satisfied, the read out operation automatically continues at a start of the next chip select frame.

4. The SPI communication system of claim 1, wherein:
if the second condition is satisfied, the slave device is configured to determine that the read out operation has been fulfilled.

5. The SPI communication system of claim 1, further comprising:
a master device configured to transmit the chip select signal and the MOSI signal to the slave device and further configured to receive the MISO signal from the slave device, wherein the master device is configured to transmit the first configuration information in the first chip select frame to start the read out operation.

6. The SPI communication system of claim 5, wherein, if the second condition is satisfied, the master device is configured to transmit second configuration information to the slave device in the next chip select frame to initiate another data operation that is distinct from the read out operation.

7. The SPI communication system of claim 5, wherein, if the first condition is satisfied, the master device is configured to not transmit a command to the slave device for incrementing the register address during the next chip select frame.

8. The SPI communication system of claim 1, wherein the first configuration information indicates the start register address for the read out operation.

9. A method of performing serial peripheral interface (SPI) communication with a slave device comprising a memory configured with a start register address and an end register address that define a register address range for a read out operation, the method comprising:
- receiving, by the slave device, a chip select signal comprising an active signal level and an idle signal level that define a plurality of chip select frames, wherein an end of each chip select frame is defined by an idle signal edge that is a transition from the active signal level to the idle signal level;
- receiving, by the slave device, a master out, slave in (MOSI) signal, wherein the MOSI signal includes configuration information received in a first chip select frame to start the read out operation;
- transmitting, by the slave device, a master in, slave out (MISO) signal comprising data portions during the read out operation, wherein each data portion is sequentially read out from a different register address of the memory;
- during an interval defined by the first chip select frame, incrementing, by the slave device, a register address to correspond to each memory location sequentially read out from the memory;
- at an end of the first chip select frame, demarked by the idle signal edge of the chip select signal, comparing, by the slave device, an end-of-frame register address with the end register address;
- on a first condition that the end-of-frame register address at the end of the first chip select frame is less than the end register address, automatically incrementing, by the slave device, the register address at a next chip select frame in order to perform automatic register address incrementation across the first and the next chip select frames; and
- on a second condition that the end-of-frame register address at the end of the first chip select frame is equal to or greater than the end register address, and stopping, by the slave device, the read out operation.

10. A serial peripheral interface (SPI) communication system, comprising:
- a slave device comprising:
  - a memory configured with a start register address and an end register address that define a register address range for a write operation;
  - a chip select terminal configured to receive a chip select signal comprising an active signal level and an idle signal level that define a plurality of chip select frames, wherein an end of each chip select frame is defined by an idle signal edge that is a transition from the active signal level to the idle signal level; and
  - a serial data input (SDI) terminal configured to receive a master out, slave in (MOSI) signal, wherein the MOSI signal includes first configuration information received in a first chip select frame to start the write operation and data portions received during the write operation, wherein each data portion is sequentially written to a different register address of the memory,
- wherein the slave device is configured to:
  - during an interval defined by the first chip select frame, increment a register address to correspond to each memory location sequentially written to the memory,
  - at an end of the first chip select frame, demarked by the idle signal edge of the chip select signal, compare an end-of-frame register address with the end register address,
  - on a first condition that the end-of-frame register address at the end of the first chip select frame is less than the end register address, automatically increment the register address at a next chip select frame in order to perform automatic register address incrementation across the first and the next chip select frames, and
  - on a second condition that the end-of-frame register address at the end of the first chip select frame is equal to or greater than the end register address, stop the write operation.

11. The SPI communication system of claim 10, wherein: if the first condition is satisfied, the slave device is configured to automatically increment the register address at a start of the next chip select frame without receiving further a command in the next chip select frame.

12. The SPI communication system of claim 10, wherein: if the first condition is satisfied, the write operation automatically continues at a start of the next chip select frame.

13. The SPI communication system of claim 10, wherein: if the second condition is satisfied, the slave device is configured to determine that the write operation has been fulfilled.

14. The SPI communication system of claim 10, further comprising:
- a master device configured to transmit the chip select signal and the MOSI signal to the slave device, wherein the master device is configured to transmit the first configuration information in the first chip select frame to start a read out operation.

15. The SPI communication system of claim 14, wherein, if the second condition is satisfied, the master device is configured to transmit second configuration information to the slave device in the next chip select frame to initiate another data operation that is distinct from the write operation.

16. The SPI communication system of claim 14, wherein, if the first condition is satisfied, the master device is configured to not transmit a command to the slave device for incrementing the register address during the next chip select frame.

17. The SPI communication system of claim 10, wherein the first configuration information indicates the start register address for the write operation.

18. A method of performing serial peripheral interface (SPI) communication with a slave device comprising a memory configured with a start register address and an end register address that define a register address range for a write operation, the method comprising:
- receiving, by the slave device, a chip select signal comprising an active signal level and an idle signal level that define a plurality of chip select frames, wherein an end of each chip select frame is defined by an idle signal edge that is a transition from the active signal level to the idle signal level;
- receiving, by the slave device, a master out, slave in (MOSI) signal, wherein the MOSI signal includes configuration information received in a first chip select frame to start the write operation and data portions received during the write operation, wherein each data portion is sequentially written to a different register address of the memory;

during an interval defined by the first chip select frame, incrementing, by the slave device, a register address to correspond to each memory location sequentially written to the memory;
at an end of the first chip select frame, demarked by the idle signal edge of the chip select signal, comparing, by the slave device, an end-of-frame register address with the end register address;
on a first condition that the end-of-frame register address at the end of the first chip select frame is less than the end register address, automatically incrementing, by the slave device, the register address at a next chip select frame in order to perform automatic register address incrementation across the first and the next chip select frames; and
on a second condition that the end-of-frame register address at the end of the first chip select frame is equal to or greater than the end register address, and stopping, by the slave device, the write operation.

19. A slave device of a serial peripheral interface (SPI) communication system, the slave device comprising:
a memory configured with a start register address and an end register address that define a register address range for a data operation;
a chip select terminal configured to receive a chip select signal comprising an active signal level and an idle signal level that define a plurality of chip select frames, wherein an end of each chip select frame is defined by an idle signal edge that is a transition from the active signal level to the idle signal level;
a serial data input (SDI) terminal configured to receive a master out, slave in (MOSI) signal, wherein the MOSI signal includes configuration information received in a first chip select frame of the data operation, wherein the configuration information includes an operation command bit indicating whether the data operation is a write operation or a read out operation and an auto-incrementation control bit indicating whether automatic register address incrementation across chip select frames is enabled or disabled;
a serial data output (SDO) terminal configured to transmit a master in, slave out (MISO) signal; and
at least one processor configured to enable and disable automatic register address incrementation across chip select frames based on the auto-incrementation control bit,
wherein the at least one processor is configured to increment a register address from the start register address to correspond to each memory location sequentially accessed for the data operation, and
wherein, when the automatic register address incrementation across chip select frames is indicated as enabled, the at least one processor is configured to automatically continue to increment the register address of the memory across two adjacent chip select frames to automatically continue the data operation across the two adjacent chip select frames.

20. The slave device of claim 19, wherein the configuration information identifies the start register address of the register address range.

21. A master device of a serial peripheral interface (SPI) communication system, the master device comprising:
a chip select terminal configured to transmit a chip select signal comprising an active signal level and an idle signal level that define a plurality of chip select frames, wherein an end of each chip select frame is defined by an idle signal edge that is a transition from the active signal level to the idle signal level; and
a master out, slave in (MOSI) terminal configured to transmit a MOSI signal to a slave device, wherein the MOSI signal includes first configuration information transmitted in a first chip select frame of a data operation, wherein the first configuration information includes an operation command bit indicating whether the data operation is a write operation or a read out operation and an auto-incrementation control bit indicating whether automatic register address incrementation across chip select frames is enabled or disabled,
wherein, when the automatic register address incrementation across chip select frames is indicated as enabled, the master device instructs at least one processor to automatically continue to increment a register address across two adjacent chip select frames to automatically continue the data operation across the two adjacent chip select frames, and
wherein the register address is configured to be incremented during the data operation to correspond to each memory location sequentially accessed for the data operation.

22. The master device of claim 21, wherein the data operation is defined by a start register address and an end register address and the master device comprises at least one processor configured to:
during an interval defined by the first chip select frame, increment a register address from the start register address to correspond to each memory location sequentially accessed for the data operation,
at an end of the first chip select frame, demarked by an idle signal edge of the chip select signal, compare an end-of-frame register address with the end register address,
on a first condition that the end-of-frame register address at the end of the first chip select frame is less than the end register address, automatically increment the register address at a next chip select frame in order to perform automatic register address incrementation across the first and the next chip select frames, and
on a second condition that the end-of-frame register address at the end of the first chip select frame is equal to or greater than the end register address, stop the data operation.

23. The master device of claim 22, wherein, if the second condition is satisfied, the at least one processor is configured to transmit second configuration information to the slave device in the next chip select frame to initiate another data operation that is distinct from the data operation.

24. The master device of claim 23, wherein, if the first condition is satisfied, the at least one processor is configured to not transmit any command to the slave device for incrementing the register address during the next chip select frame.

* * * * *